Dec. 17, 1946.    E. A. CALHOUN    2,412,672
HITCH
Filed Sept. 2, 1944
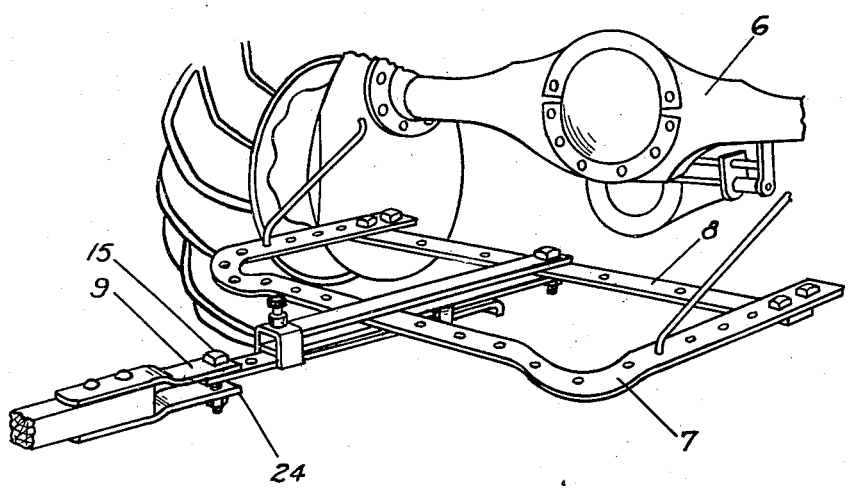
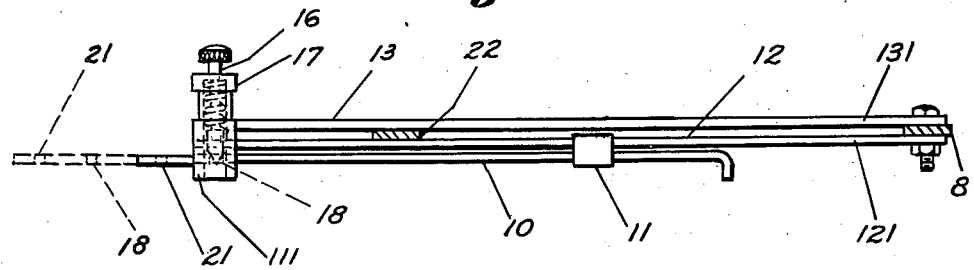
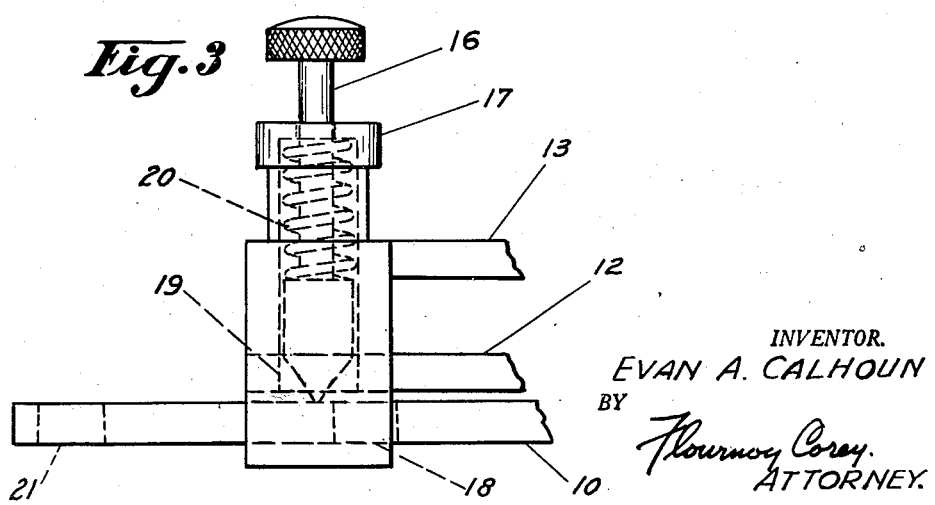
INVENTOR.
EVAN A. CALHOUN
BY
Flournoy Corey.
ATTORNEY.

Patented Dec. 17, 1946

2,412,672

UNITED STATES PATENT OFFICE 2,412,672

HITCH

Evan A. Calhoun, Jesup, Iowa

Application September 2, 1944, Serial No. 552,399

5 Claims. (Cl. 280—33.44)

1

This invention relates to farm equipment and the like and has particular relation to improvements in hitches suitable for connecting drawn implements to tractors and the like.

In connecting tractors to farm implements by the usual hitches known to the art, it is extremely difficult to stop the tractor at just exactly the right point to permit the tongue of the implement or like member to be exactly positioned so that when the tongue is raised to alignment with the drawbar of the tractor it also will be in alignment with reference to the pin or other coupling used in connecting the tractor drawbar with the tongue of the draw implement. It is usually necessary for the operator to move the tractor several times before alignment can be secured and any inequality or mal-positioning of the tractor and implement requires considerable tugging and working before the pin can be dropped into place. Usually two men are necessary.

Another difficulty encountered in these tractors is that the tractor may become mired down or stuck in soft soil so that when the drawn implement is attached it is impossible to move the tractor.

It is among the objects of my invention to overcome the difficulties above enumerated and to provide means whereby it is only necessary, in coupling a tractor to an implement, to back the tractor up to its approximate position, secure a slidable drawbar to the implement and then back the tractor up until an automatic connection is engaged.

Another important object of my invention is to provide a new and improved hitch which will compensate for any mal-positioning of the tractor and implement and which is self engaging.

Other and further features and objects of the invention will be more apparent to those skilled in the art upon a consideration of the accompanying drawing and following specifications, wherein is disclosed a single exemplary embodiment of the invention, with the understanding, however, that such changes may be made therein as fall within the scope of the appended claims, without departing from the spirit of the invention.

In said drawing:

Figure 1 is a partial view in perspective illustrating a portion of the rear of the tractor, and a hitch constructed according to the embodiment of my invention, and the tongue of an implement to be towed.

Figure 2 is a view in side elevation of the

2 hitch shown in Figure 1. Dotted lines indicate the extended position of the drawbar, and Figure 3 is a a fragmentary view in side elevation of a drawbar locking means constructed according to one embodiment of my invention.

Referring to the drawing, and more particularly to Figure 1 thereof, I have illustrated at Figure 1 how a tractor 6 carrying a yoke-like member 7 and crossbar 8 may be secured to a piece of drawn equipment such as a plow or the like by use of slidable member drawbar hitch as illustrated in Figure 2 when hitching to the tongue of an implement which is indicated at 9 in Figure 1.

In the present embodiment of my invention, a hitch constructed according to a preferred embodiment of the invention includes a slidable member or drawbar 10 slidable in rectangular strap supports or boxes 11 and 111. The boxes 11 and 111 are secured as by welding or the like to a strap 12 which constitutes the primary member of the hitch. A third bar member 13 extends in straight parallel relation to the bar 12 and is welded or otherwise secured in place in the strap 111 at one end of the bar. The free projecting companion ends of the bars 12 and 13 constitute a clevis-like member at 121 and 131 adapted to form a connection with the cross bar of the tractor 8. The bars 12 and 13 are separated so that they may be engaged over the cross member 22 of the yoke 7. The box member 111 is provided with a floating pin 16 slidable in a collar 17 so that when the hole 18 in the slidable bar 10 comes into alignment with the pin 16 and the hole 19 in the bar 12 the pin 16 will be forced downwardly by the combined action of gravity and the spring 20 so that the bar 10 will be rigidly engaged with the bar 12.

In use, the bar 10 is extended and the tractor 6 backed up to the plow or other drawn equipment until the operator sitting on the driver's seat of the tractor thinks that the extended end of the slidable member 10 is substantially in line, with the hole 21 approximately in alignment with the hole in the end of the tongue 9 of the plow or the like. It is obvious that it would be practically impossible for the operator, particularly from his seat on the tractor, to exactly position the drawbar of the tractor over the tongue of the drawn implement so that the drawn coupling 24 would allow bolt 15 to drop into place. After the connection between the end of the extended bar 10 and the tongue 9 is effected as by means of the bolts 15, the operator returns to his seat on the tractor, and backs the tractor up until the pin 16 drops into engagement with the opening 18 in drawbar 10. The coupling of the tractor and drawn equipment is then completed and the operator can drive off towing the drawn equipment.

An important advantage of the slidable drawbar just described is that if the tractor gets stuck the operator may uncouple the tongue 9 by removing bolt 15 and move the tractor forward to smooth out a path or level off a portion of the ground. He can then extend the sliding bar 10, couple it to the tongue 9 and draw the equipment out without the necessity of dropping the tractor back in the hole it had previously made.

Although I have described a specific embodiment of my invention, it is apparent that modifications thereof may be made by those skilled in the art. Such modifications may be made without departing from the spirit and scope of my invention as set forth in the appended claims.

I claim as my invention:

1. A hitch device for tractors and the like having a drawbar support, comprising a pair of strap members pivoted at their forward ends to said support and extending rearwardly of the latter and on upper and lower sides thereof, a rear supporting bracket connecting the rear ends of said strap members and extending below the lower strap member, a forward supporting bracket carried by the lower strap member and also extending below the latter, and a slidable drawbar carried by said brackets.

2. A hitch device for tractors and the like having a drawbar support and a transverse draft member, said hitch device comprising a drawbar including a pair of strap members connected at their forward ends to said transverse draft member, said strap members extending rearwardly of said drawbar support on opposite sides thereof, a rear supporting bracket connected to the rear ends of both of said strap members and extending below the lower strap member, a forward supporting bracket carried by the lower strap member forward of said rear bracket, a slidable draft-transmitting member carried by said brackets, a stop on the forward end of said slidable member engageable with the forward bracket for defining a rear position of said slidable member, and a lock carried by the rear bracket and engageable in an aperture in said slidable member for defining a forward position of said slidable member.

3. A hitch device as defined in claim 2, further characterized by strap members being pivoted to said transverse draft member and said strap members and said slidable member swingable together about said pivot axis.

4. An extension hitch comprising a primary drawbar, a pair of brackets carried by said primary drawbar, in longitudinally spaced relation, a slidable drawbar carried by said brackets, means forming a stop on said slidable drawbar for limiting the rearward movement of said slidable drawbar, there being an aperture in the latter spaced closer to said stop means than the distance between said brackets, and biased means carried by the rear bracket and engageable in the aperture in said slidable drawbar to releasably lock the latter in a forward position.

5. An extension hitch comprising a primary drawbar, a pair of brackets carried thereby in longitudinally spaced relation, a slidable drawbar carried in said brackets, the forward end of said slidable drawbar being turned downwardly to form a stop engageable with the forward bracket to limit the rearward movement of said slidable drawbar, there being an aperture in the latter spaced closer to said turned down end than the distance between said brackets, and a plunger carried by said rear bracket and engageable in said aperture to releasably lock the slidable drawbar in its forward position.

EVAN A. CALHOUN.